(12) United States Patent
Fukuda et al.

(10) Patent No.: US 7,635,083 B2
(45) Date of Patent: Dec. 22, 2009

(54) SYSTEM AND METHOD FOR UTILIZING A MOBILE DEVICE TO OBTAIN A BALANCE ON A FINANCIAL TRANSACTION INSTRUMENT

(75) Inventors: Kazuyuki Fukuda, Tokyo (JP); Deanna E. Barber, Sandy, UT (US); Karen L. Larsen, Taylorsville, UT (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

(21) Appl. No.: 11/523,186

(22) Filed: Sep. 19, 2006

(65) Prior Publication Data

US 2007/0194104 A1 Aug. 23, 2007

Related U.S. Application Data

(60) Provisional application No. 60/719,049, filed on Sep. 20, 2005.

(51) Int. Cl.
*G06F 17/60* (2006.01)
(52) U.S. Cl. ....................... 235/379; 235/380
(58) Field of Classification Search ................. 235/379, 235/380; 705/26, 16–18, 35, 39, 40, 44, 705/64, 72, 76–77; 455/517, 556.1, 556.01
See application file for complete search history.

(56) References Cited

U.S. PATENT DOCUMENTS

2003/0211863 A1\* 11/2003 Neifer ...................... 455/556.1
2004/0058705 A1\* 3/2004 Morgan et al. ........... 455/556.1
2004/0121789 A1\* 6/2004 Lindsey ....................... 455/517

\* cited by examiner

*Primary Examiner*—Daniel St.Cyr
(74) *Attorney, Agent, or Firm*—Fitzpatrick, Cella, Harper & Scinto

(57) ABSTRACT

The balance of funds remaining for a stored-value card ("SVC") may easily be determined without going through an actual purchase transaction with the SVC. The balance is obtained wirelessly from a server storing information pertaining to SVCs, and may be provided in a discreet manner. A card reader adds a card security code to a card number read from the SVC, and encrypts the card number and the CSC. The encrypted information is wirelessly sent to a cellular telephone. The cellular telephone decrypts the encrypted information and wirelessly transmits a balance-information request, which includes the card number and the CSC, to the server. The server receives the request and wirelessly sends the requested balance information to the cellular telephone and, in turn, the cellular telephone wirelessly sends the requested balance information to the card reader, which provides the information to the requester.

13 Claims, 4 Drawing Sheets

SYSTEM AND METHOD FOR UTILIZING A MOBILE DEVICE TO OBTAIN A BALANCE ON A FINANCIAL TRANSACTION INSTRUMENT

CROSS REFERENCE TO RELATED APPLICATION

This application claims benefit of and priority to U.S. Provisional Application No. 60/719,049 filed on Sep. 20, 2005, the entire disclosure of which is incorporated by reference.

BACKGROUND OF THE INVENTION

1. Field of the Invention

The present invention generally relates to a system and a method for obtaining information regarding a financial transaction instrument, and more particularly, to a system and a method for wirelessly obtaining a balance on a pre-paid gift card via a mobile communication device.

2. Related Art

Consumers very often use financial transaction instruments as convenient forms of payment for purchases of goods and/or services ("goods/services"). A "financial transaction instrument," also referred to herein as a "card," may be any of the following: a traditional "plastic" transaction card (e.g., a credit card, a charge card, a debit card, a gift card, a pre-paid or stored-value card, or the like); a titanium-containing, or other metal-containing, transaction card; a clear or translucent transaction card; a foldable or otherwise unconventionally-sized transaction card; a radio-frequency-enabled transaction card; or any other type of card used in connection with a financial transaction.

A financial transaction instrument may be configured with electronic functionality. For example, such an instrument can have electronic circuitry that is printed or otherwise incorporated onto or within it (commonly being referred to as a "smart card"), or may be a fob-type device having a transponder and a radio-frequency identification ("RFID") reader. Additionally, a financial transaction instrument may be magnetically encoded with information, such as through use of a magnetic stripe, for example. Optionally, a financial transaction instrument may include a visible card identification number ("CID") uniquely identifying a corresponding transaction account, in case the transaction instrument cannot easily be read electronically or magnetically.

A "transaction account," as used herein, refers to an account associated with an open-account system or a closed-account system, which are discussed in more detail below. A transaction account may exist in a physical or a non-physical embodiment. For example, a transaction account may be distributed in a non-physical embodiment such as an account number, a frequent-flyer account, a telephone calling account, or the like. Furthermore, a physical embodiment of a transaction account may be distributed as a financial transaction instrument.

"Open cards" are financial transaction instruments associated with an open-account system and generally are accepted by different merchants. Examples of open cards include the American Express®, Visa®, MasterCard® and Discover® cards, which may be used at many different retailers and other businesses. In contrast, "closed cards" are financial transaction instruments associated with a closed-account system and may be restricted to use in a particular store, a particular chain of stores, or a collection of affiliated stores. One example of a closed card is a pre-paid gift card for The Gap®, which typically is purchased at and may only be accepted at The Gap® stores. Note, however, that pre-paid gift cards, also known as stored-value cards, are not limited to closed cards but instead may be open cards issued by, for example, American Express®, Visa®, Discover®, MasterCard®, or the like.

Generally, a merchant that wants to provide customers with the option to pay for goods/services with a particular type of open card will enter into an agreement with the issuer of that type of card (e.g., American Express®, Visa®, Discover®, MasterCard®, or the like). The issuer typically is a financial organization (e.g., American Express®, JPMorgan Chase, MBNA®, Citibank®, or the like) whose card-issuing activities are government regulated.

Because of the wide use of cards by consumers, the types and number of merchants that accept cards has grown and now include, in addition to the more traditional merchants such as stores and restaurants, taxi drivers, doctors, schools, street vendors, on-line vendors, and government agencies, to name a few. Through the use of cards, merchants are able to obtain prompt payment for the purchased goods/services.

Issuers have a financial incentive to contract with as many merchants as possible to accept their cards. Typically, an issuer is paid a so-called "discount rate" by each merchant signed up to accept payment using the issuer's type of card. The discount rate may be, for example, a flat rate paid periodically or a rate based on the merchant's net sales that are paid for using the issuer's type of card.

In order to convince merchants to accept its card, an issuer may provide the merchants with assistance with the set-up process, at no cost to the merchants. The set-up process may include: providing the merchants with point-of-sale ("POS") devices, including hardware and software for reading cards; providing training to employees of the merchants as to how to use the POS devices; providing communication equipment and establishing communication procedures for obtaining quick payment authorizations; and troubleshooting services.

A POS device may be any electronic device used by a merchant to input information regarding a purchase as well as other information, such as information regarding the merchant, information for identifying a financial transaction account from which payment for the purchase is to be obtained, etc. For example, the input information may include a dollar amount of the purchase and identification information electronically and/or magnetically read from a card used to make the purchase. Optionally, the identification information may be manually input at the POS device based on a visible CID. The POS device transmits the purchase information and the identification information to the issuer's computer system, which identifies the financial transaction account and makes a determination of whether the purchase is approved or rejected based on account information regarding the financial transaction account. The issuer's computer system then transmits a message back to the POS device regarding the purchase. Examples of messages sent between the POS device and the issuer's computer system include: a request for authorization, an authorization approval or rejection; an instruction to obtain additional identification to verify the identity of the person presenting the card; a message indicating that the financial transaction account has reached a maximum aggregate dollar amount; etc.

Often, a merchant wants to know the balance of funds remaining for a gift or other stored-value card (referred to herein as an "SVC"), such as a pre-paid gift card, before the merchant commences a purchase transaction with the SVC. This information would allow the merchant easily to determine whether the SVC has sufficient funds to pay for the item(s) to be purchased without having to go through the steps of an actual purchase transaction. In a typical purchase transaction, the merchant uses a POS device in electronic communication with the issuer's computer system to submit a request for authorization of the purchase to be made with the SVC, and obtains a reply via the POS device either approving or denying the request. When an SVC transaction is denied due to an insufficient balance of funds remaining for the SVC, it can subject the customer to embarrassment and public humiliation, and can subject the merchant to discomfort as well at having to embarrass the customer. Such bad feelings, in turn, may result in the customer refusing to purchase goods/services from the merchant in the future. This can lead to merchants refusing to accept SVCs altogether, as a way to prevent the loss of current and future business from customers whose SVC transactions were denied.

Similarly, a customer who would like to pay for a purchase with an SVC often wants an easy way to determine the balance of funds remaining for the SVC without having to go through an actual purchase transaction. This allows the customer to avoid public embarrassment should the cost of the purchase exceed the balance, and also allows the customer a greater sense of freedom to shop for more expensive items knowing that the balance is sufficient to cover the costs of those items.

Given the foregoing, what is needed is a system, a method, and a computer program product for quickly and easily providing a balance of funds remaining for an SVC without requiring an actual purchase transaction to take place.

BRIEF DESCRIPTION OF THE INVENTION

The present invention meets the above-identified needs by providing a system, a method, and a computer program product that enables a merchant and/or a cardholder of an SVC to obtain information on a balance of funds remaining for the SVC. The balance is obtained wirelessly from a server storing information pertaining to SVCs in circulation for an issuer. The balance is provided in a discreet manner to the merchant and/or the cardholder.

An advantage of the present invention is that it allows the merchant and/or the cardholder to have the SVC quickly read by a card reader positioned at a convenient location at the merchant's premises and obtain the balance of funds remaining for the SVC. The card reader does not require dedicated communication lines typically used for conventional POS devices, which limit where the POS devices may be located, but instead may be deployed anywhere there is an electrical outlet. Optionally, the card reader may be battery-powered, in which case the card reader may be positioned (and repositioned) at any convenient place that is easily accessible by the merchant and/or the cardholder. The card reader communicates wirelessly with the server storing the requested information.

According to the present invention, a system, a method, and a computer program product is provided for enabling a requester (e.g., a merchant and/or a cardholder) to obtain information on the balance of funds remaining in a SVC. The requester causes a card reader to read the SVC to obtain a card number for the SVC. The card reader adds a card security code ("CSC") to the card number and encrypts the card number and the CSC. In an embodiment, the card reader uses Bluetooth®—standard communication technology to send the encrypted information to a cellular telephone wirelessly.

In an embodiment, the cellular telephone receives the encrypted information and uses a software application based on Qualcomm's BREW® (Binary Runtime Environment for Wireless) platform to decrypt the encrypted information and obtain the card number and the CSC. The cellular telephone uses a Secure Sockets Layer ("SSL") connection with a server system to transmit a request, which includes the card number and the CSC, wirelessly to the server system via a communication network. The request with card number and the CSC is transmitted according to the Secure HyperText Transfer Protocol ("HTTPS").

The server system receives the request and obtains the requested information, i.e., the balance of funds remaining for the SVC corresponding to the card number provided with the request. The server system validates the CSC provided with the request and also validates the status of the card corresponding to the card number. If the request fails the validation process, no balance information would be returned to the card reader. If the CSC and the card number pass the validation process, the server system wirelessly sends the requested balance information to the cellular telephone via the communication network and, in turn, the cellular telephone wirelessly sends the requested balance information to the card reader, which prints and/or displays the information for the requester.

Further features and advantages of the present invention as well as the structure and operation of various embodiments of the present invention are described in detail below with reference to the accompanying drawings.

BRIEF DESCRIPTION OF THE DRAWINGS

The features and advantages of the present invention will become more apparent from the detailed description set forth below when considered in conjunction with the attached drawings, in which like reference numbers indicate identical or functionally similar elements. Additionally, the left-most digit of a reference number identifies the drawing in which the reference number first appears.

DETAILED DESCRIPTION OF THE INVENTION

I. Overview

The present invention is directed to a system, a method, and a computer program product for providing information on a balance of funds remaining for an SVC without requiring an actual purchase transaction to be processed. The information may be obtained at any time and provided to a requester (e.g., a merchant, a cardholder, etc.) in a discreet manner such that others in the vicinity of the requester cannot easily know the information being provided.

Balance information may be requested by a merchant or by a cardholder with or without the assistance of the merchant.

As used herein, the term "merchant" refers to any person, entity, distributor system, software, and/or hardware that is a provider or broker of goods/services, and includes any other entity in the distribution chain of goods/services. For example, a merchant may be a grocery store, a retail store, a travel agency, a service provider, a public-service utility, a school, a library, an on-line merchant, a government agency, or the like. Also, as used herein, the terms "consumer," "customer," "cardholder," and "user" may be used interchangeably to refer to a person who purchases goods/services from a merchant using a card.

II. System

Figure 1:
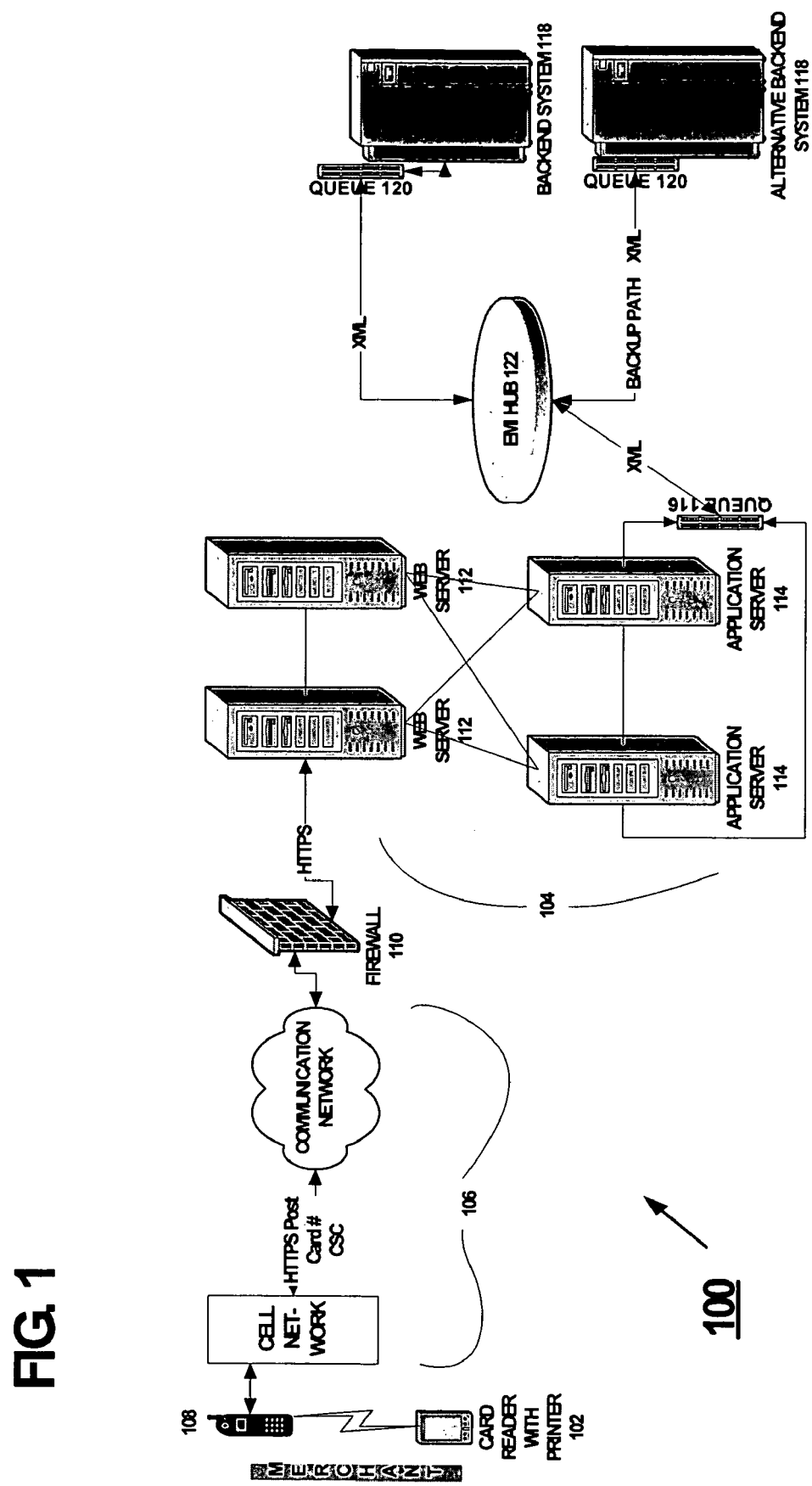
FIG. 1 schematically illustrates a system diagram of an exemplary balance-inquiry system, according to an embodiment of the present invention.

FIG. 1 shows a schematic system diagram of an exemplary balance-inquiry system 100, used to implement or practice one or more embodiments of the present invention. The system 100 includes a card reader 102 configured to read information from an SVC and to communicate wirelessly with a server system 104 via a communication network 106. The server system 104 may include a single server or may include a plurality of servers configured to receive and process requests for balance information. The communication network 106 may be the Internet, a cellular communication network, a satellite communication network, or a combination thereof, or any other means of communication between the card reader 102 and the server system 104. Preferably, the communication network 106 is a combination of the Internet and a cellular communication network, and the server system 104 includes one or more Web servers 112 for receiving requests transmitted via the Internet and for sending the requests to one or more application servers 114. The one or more application servers 114 process the requests and send the processed requests as XML files to a queue processor 116.

The queue processor 116 obtains the requested balance information for each of the XML files from one or more backend systems 118, which store and update information for SVCs in circulation for an issuer. Each backend system 118 includes a queue processor 120 for handling requests for information received from the queue processor 116. Optionally, a hub device 122 may be used to distribute the requests for information to the queue processor(s) 120 of the one or more backend systems 118.

The card reader 102 is equipped to read information from an SVC by known electronic, magnetic, or optical techniques, or by a combination thereof. Optionally, the card reader 102 may be equipped with a keypad (not shown) for enabling manual input of a CID visible on the SVC. The card reader 102 includes a printer for printing balance information received from the server system 104. The printer generally is small in size and is similar to the printers incorporated in small handheld calculators, for example. This allows the requester to obtain the balance information discreetly on a small piece of paper, without others in the vicinity of the card reader 102 hearing or seeing the balance information. Optionally, the card reader 102 may include a display screen (not shown) and a selector device (not shown) for enabling the requester to select whether to have the balance information displayed on the screen, printed on paper by the printer, or both. Alternatively, the card reader 102 may include only the display screen and not the printer for displaying the balance information.

In an embodiment, the card reader 102 is an Am-Tech Mobile Pro SPECTRUM II magnetic card reader (JIS I/II) with a direct line thermal printer and a Bluetooth® SPP (Serial Port Profile) transmission/reception module.

Communication between the card reader 102 and the server system 104 occurs wirelessly via a mobile communication device, such as a cellular telephone 108. The cellular telephone 108 may be incorporated in the card reader 102 or may be located external to the card reader 102 and communicate wirelessly with the card reader 102 via known Bluetooth® communication standards. This allows a single cellular telephone 108 to be used for a plurality of card readers 102. The cellular telephone 108 transmits and receives information from the server system 104 via the communication network 106. For example, the cellular telephone 108 transmits information to a base station, and the information is subsequently sent from the base station to a packet network and the Internet, which delivers the information to the server system 104. Preferably, the cellular telephone 108 is equipped with Qualcomm's BREW® platform.

Optionally, to ensure security, communications between the card reader 102 and the server system 104 may occur indirectly through a security filter such as, for example, a firewall 110, which may be implemented with hardware, software, or a combination thereof. Other types of security measures may be employed, as will be appreciated by persons of skill in the relevant art(s).

III. Process

Figure 2:
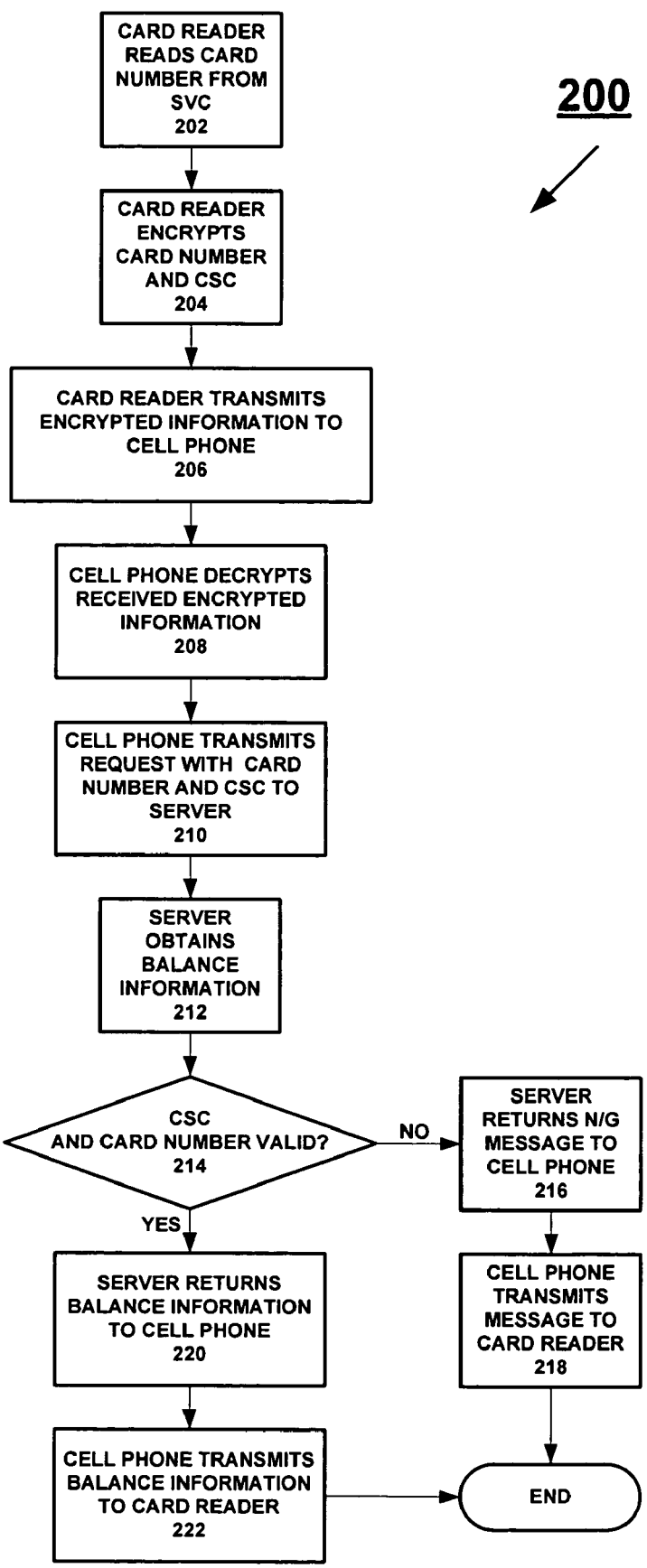
FIG. 2 shows a flowchart illustrating a balance-inquiry process, according to an embodiment of the present invention.

Referring to FIG. 2, a flowchart illustrating a balance-inquiry process 200, according to an embodiment of the present invention, is shown. Preferably, the process 200 utilizes the balance-inquiry system 100. The process 200 begins at step 202, at which a requester (e.g., a merchant, a cardholder, etc.) causes the card reader 102 to read an SVC by, for example, "swiping" the SVC in a slotted track of the card reader 102. As mentioned earlier, the SVC is read electronically, magnetically, optically, or by a combination of such techniques, to obtain a card number. Optionally, the card number may be input manually by the requester.

At step 204, the card reader 102 adds a card security code ("CSC") to the card number and encrypts the card number and the CSC. For example, the CSC may be a five-digit number ("5CSC"). At step 206, the card reader 102 uses Bluetooth®—standard communications to send the encrypted information to the cellular telephone 108 wirelessly. At step 208, the cellular telephone 108 receives the encrypted information and uses a software application based on Qualcomm's BREW® platform to decrypt the encrypted information and obtain the card number and the CSC.

At step 210, the cellular telephone 108 uses a Secure Sockets Layer (SSL) connection with the server system 104 to wirelessly transmit a request, which includes the card number and the CSC to the server system 104 via the communication network 106. For example, Verisign's SSL Certificate may be used. The request with card number and the CSC is transmitted according to the Secure HyperText Transfer Protocol ("HTTPS") using, for example, HTTPS Port 443. One of ordinary skill in the relevant art(s) will appreciate that secure transmission methods other than SSL and HTTPS may be used.

At step 212, the server system 104 receives the request and obtains the requested information, i.e., the balance of funds remaining for the SVC corresponding to the card number provided with the request. At step 214, the server system 104 validates the CSC provided with the request and also validates the status of the card corresponding to the card number. For example, if the card corresponding to the card number has been reported as being stolen or lost, or the card number has not yet been activated and thus has no stored value, the card would have an "inactive" status and the request would not pass the validation process. Similarly, if the CSC cannot be verified as authentic, the request would not pass the validation process. If the request fails the validation process, no balance information is returned to the card reader 102. Instead, at step 216, the server system 104 returns a message indicating "N/G" (No Good) or a similar type of message to the cellular telephone 108, which forwards the message to the card reader 102. The card reader 102 then prints and/or displays the message for the requester, at step 218.

If the CSC and the card number pass the validation process, at step 220, the server system 104 wirelessly sends the requested balance information to the cellular telephone 108 via the communication network 106. Preferably, the server system 104 uses the SSL connection with the cellular telephone 108 to perform an HTTPS transmission of the requested balance information via the communication network 106. In turn, the cellular telephone 108 uses Bluetooth®—standard communications to send the requested balance information wirelessly to the card reader 102, at step 222, which prints and/or displays the information for the requester.

Figure 3:
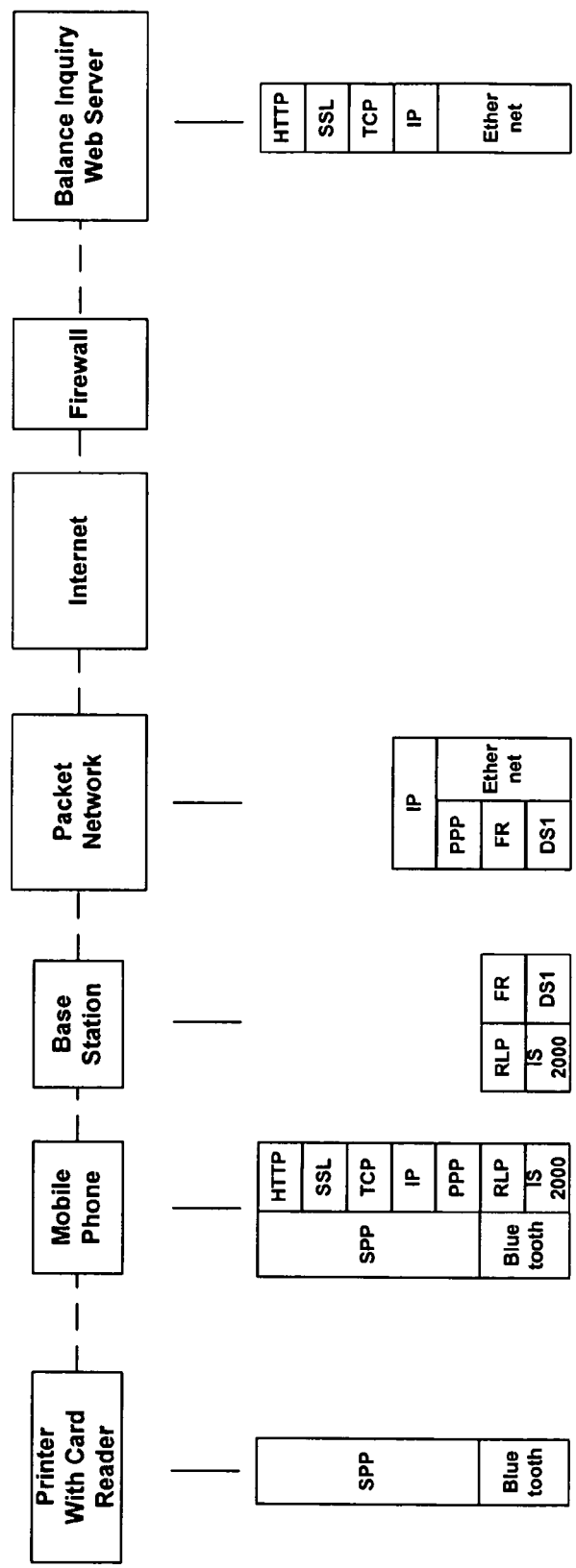
FIG. 3 shows a table of communication protocols, according to an embodiment of the present invention.

FIG. 3 shows examples of communication protocols that may be used with the present invention. One of ordinary skill in the relevant art(s) will appreciate that the present invention is not limited to the protocols shown in FIG. 3; the use of other communication protocols is within the scope of the present invention.

Although the present invention as described above uses a mobile communication device, such as the cellular telephone 108, to communicate with the server system 104, in an alternative embodiment the card reader 102 wirelessly sends encrypted information (i.e., an encrypted card number and CSC) to a computer (e.g., a desktop computer, a notebook or laptop computer, a personal digital assistant, or the like) configured to send/receive Bluetooth®—standard communications. The computer decrypts the encrypted information and sends a request for balance information to the server system 104. The request includes the card number and the CSC, and may be sent wirelessly or through standard wired connections according to SSL and HTTPS protocols.

IV. Example Implementation(s)

The present invention (i.e., the balance-inquiry system 100, the balance-inquiry process 200 or any part(s) or function(s) thereof) may be implemented using hardware, software, or a combination thereof, and may be implemented in one or more computer systems or other processing systems. Useful machines for performing some or all of the operations of the present invention include general-purpose digital computers or similar devices.

Figure 4:
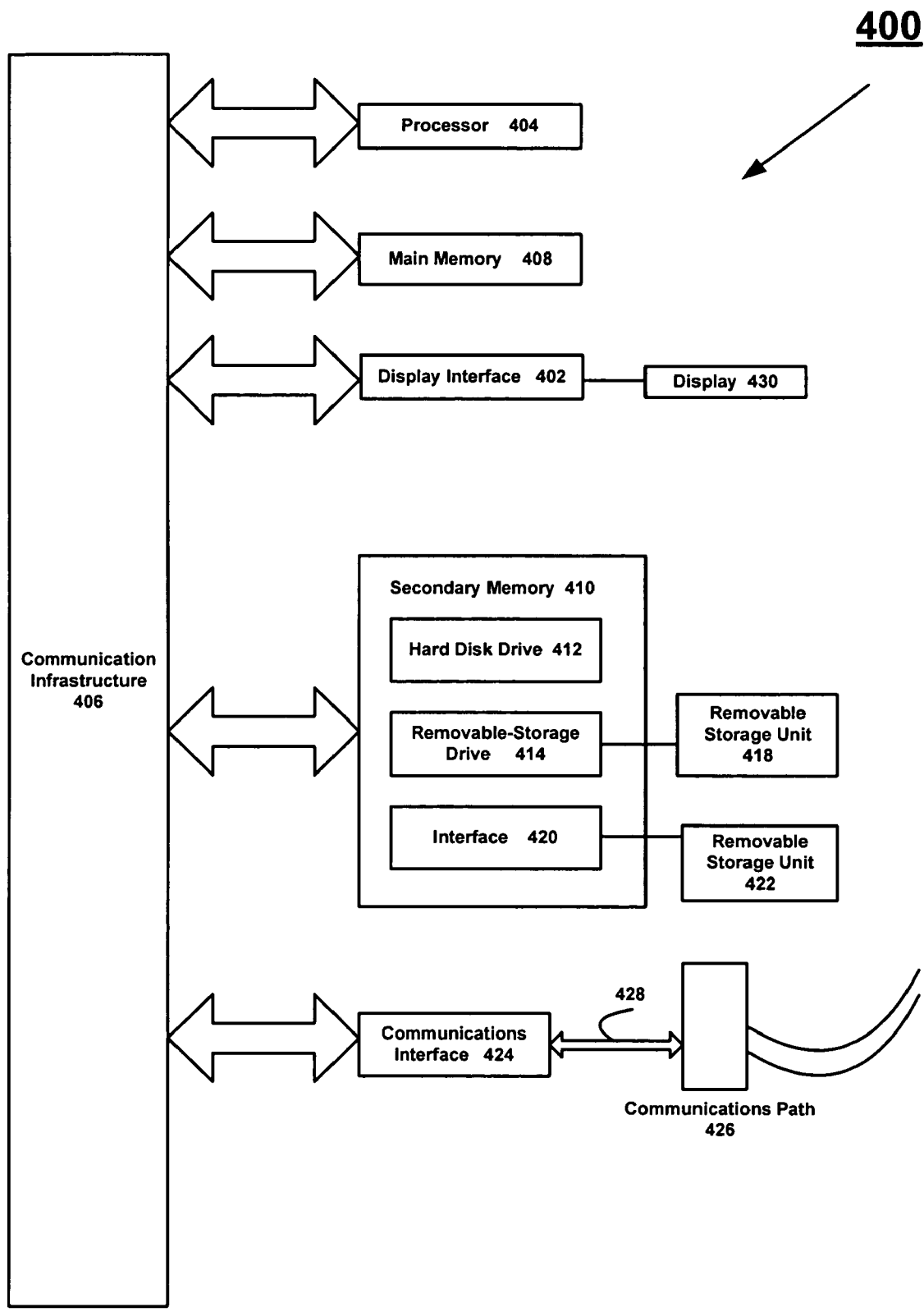
FIG. 4 shows a block diagram of an exemplary computer system useful for implementing the present invention.

In fact, in one embodiment, the present invention is directed toward one or more computer systems equipped to carry out the functions described herein. An example of such a computer system 400 is shown in FIG. 4.

The computer system 400 includes at least one processor 404. The processor 404 is connected to a communication infrastructure 406 (e.g., a communications bus, a cross-over bar device, or a network). Although various software embodiments are described herein in terms of this exemplary computer system 400, after reading this description, it will become apparent to a person skilled in the relevant art(s) how to implement the invention using other computer systems and/or architectures.

The computer system 400 includes a display interface 402 that forwards graphics, text, and other data from the communication infrastructure 406 (or from a frame buffer (not shown)) for display on a display unit 430.

The computer system 400 also includes a main memory 408, which preferably is a random access memory (RAM), and may also include a secondary memory 410. The secondary memory 410 may include, for example, a hard disk drive 412 and/or a removable-storage drive 414 (e.g., a floppy disk drive, a magnetic tape drive, an optical disk drive, and the like). The removable-storage drive 414 reads from and/or writes to a removable storage unit 418 in a well-known manner. The removable storage unit 418 may be, for example, a floppy disk, a magnetic tape, an optical disk, and the like, which is written to and read by the removable-storage drive 414. As will be appreciated, the removable storage unit 418 includes a computer-usable storage medium having stored therein computer software and/or data.

In alternative embodiments, the secondary memory 410 may include other similar devices for allowing computer programs or other instructions to be loaded into the computer system 400. Such devices may include a removable storage unit 422 and an interface 420 (e.g., a program cartridge and a cartridge interface similar to those used with video game systems); a removable memory chip (e.g., an erasable programmable read-only memory ("EPROM") or a programmable read-only memory ("PROM")) and an associated memory socket; and other removable storage units 422 and interfaces 420 that allow software and data to be transferred from the removable storage unit 422 to the computer system 400.

The computer system 400 may also include a communications interface 424, which allows software and data to be transferred between the computer system 400 and external devices (not shown). Examples of the communications interface 424 may include a modem, a network interface (e.g., an Ethernet card), a communications port, a Personal Computer Memory Card International Association ("PCMCIA") interface, and the like. Software and data transferred via the communications interface 424 are in the form of signals 428, which may be electronic, electromagnetic, optical or another type of signal that is capable of being received by the communications interface 424. These signals 428 are provided to the communications interface 424 via a communications path 426 (e.g., a channel). The communications path 426 carries the signals 428 and may be implemented using wire or cable, fiber optics, a telephone line, a cellular link, a radio-frequency ("RF") link, or the like.

As used herein, the phrases "computer program medium" and "computer usable medium" may be used to generally refer to a removable storage unit 418 used with the removable-storage drive 414, a hard disk installed in the hard disk drive 412, or and the signals 428, for example. These computer program products provide software to the computer system 400. The present invention may be implemented or embodied as one or more of such computer program products.

Computer programs (also referred to as computer control logic) are stored in the main memory 408 and/or the secondary memory 410. The computer programs may also be received via the communications interface 424. Such computer programs, when executed, enable the computer system 400 to perform the features of the present invention, as discussed herein. In particular, the computer programs, when executed, enable the processor 404 to perform the features of the present invention. Accordingly, such computer programs represent controllers of the computer system 400.

In an embodiment where the present invention is implemented using software, the software may be stored in a computer program product and loaded into the computer system 400 using the removable-storage drive 414, the hard drive 412, or the communications interface 424. The control logic (software), when executed by the processor 404, causes the processor 404 to perform the functions of the present invention as described herein.

In another embodiment, the present invention is implemented primarily in hardware using, for example, hardware components such as application-specific integrated circuits ("ASICs"). Implementation of such a hardware arrangement so as to perform the functions described herein will be apparent to persons skilled in the relevant art(s).

In yet another embodiment, the present invention is implemented using a combination of both hardware and software.

V. Conclusion

The various embodiments of the present invention described above have been presented by way of example and not limitation. It will be apparent to persons skilled in the relevant art(s) that various changes in form and detail can be made therein (e.g., different hardware, communications protocols, and the like) without departing from the spirit and scope of the present invention. Thus, the present invention should not be limited by any of the above-described exemplary embodiments, but should be defined only in accordance with the following claims and their equivalents. It is also to be understood that the steps and processes recited in the claims need not be performed in the order presented.

In addition, it should be understood that the attached drawings, which highlight the functionality and advantages of the present invention, are presented as illustrative examples. The architecture of the present invention is sufficiently flexible and configurable, such that it may be utilized (and navigated) in ways other than that shown in the drawings.

Further, the purpose of the appended Abstract is to enable the U.S. Patent and Trademark Office and the public generally, and especially scientists, engineers, and practitioners in the relevant art(s), who are not familiar with patent or legal terms and/or phraseology, to determine quickly from a cursory inspection the nature and essence of the technical subject matter disclosed herein. The Abstract is not intended to be limiting as to the scope of the present invention in any way.

What is claimed is:

1. A method for providing a requester with information on a balance of funds remaining for a stored-value card, the method comprising the steps of:
    at a card reader:
        (a) reading card information from the stored-value card,
        (b) adding a security code to the card information,
        (c) encrypting the security code and the card information to form encrypted information, wherein the encrypting is performed using an encryption method that enables only a mobile communication device of the requester to decrypt the encrypted information, and
        (d) wirelessly transmitting the encrypted information to the mobile communication device of the requester, such that the card reader can communicate securely and directly with a plurality of mobile communication devices, irrespective of form factors of the plurality of mobile communication devices;
    at the mobile communication device of the requester:
        (e) decrypting the information encrypted and transmitted by the card reader to obtain the security code and the card information,
        (f) using a secure communication protocol to wirelessly transmit a request for balance information to a server system via a communication network, the request including the security code and the card information,
        (g) using the secure communication protocol to wirelessly receive the balance information from the server system, and
        (h) transmitting the balance information to the card reader; and
    at the card reader:
        (i) providing the balance information to the requester.

2. A method according to claim 1, wherein the step (a) of reading the card information is performed by any or all of: an electronic technique, a magnetic technique, and an optical technique.

3. A method according to claim 1, wherein the step (e) of decrypting the information encrypted and transmitted by the card reader is performed using a decryption platform that decrypts wireless transmissions.

4. A method according to claim 1, wherein the steps (f) and (g) of using the secure communication protocol include using at least one of an SSL protocol and an HTTPS protocol.

5. A method according to claim 1, wherein the step (i) of providing the balance information includes printing the balance information.

6. A method according to claim 1, wherein the mobile communication device of the requester is a telephone.

7. A balance-inquiry system for providing a requester with information on a balance of funds remaining for a stored-value card, the system comprising:
    a card reader; and
    a mobile communication device of the requester,
    wherein the card reader is configured to:
        read card information from the stored-value card,
        add a security code to the card information,
        encrypt the security code and the card information to form encrypted information using an encryption method that enables only the mobile communication device of the requester to decrypt the encrypted information,
        communicate securely and directly with a plurality of mobile communication devices, irrespective of form factors of the plurality of mobile communication devices,
        wirelessly transmit the encrypted information to the mobile communication device, and
        receive balance information from the mobile communication device, and
    wherein the mobile communication device is configured to:
        decrypt the information encrypted and transmitted by the card reader to obtain the security code and the card information,
        use a secure communication protocol to wirelessly transmit a request for the balance information to a server system via a communication network, the request including the security code and the card information,
        use the secure communication protocol to wirelessly receive the balance information from the server system, and
        transmit the balance information to the card reader.

8. A system according to claim 7, wherein the card reader includes a printer for printing the balance information received from the mobile communication device.

9. A system according to claim 7, wherein the card reader reads the card information by any or all of: an electronic technique, a magnetic technique, and an optical technique.

10. A system according to claim 7, wherein the card reader and the mobile communication device include a communication module for performing wireless communications.

11. A system according to claim 7, wherein the card reader decrypts the information encrypted and transmitted by the card reader using a decryption platform that decrypts wireless transmissions.

12. A system according to claim 7, wherein the secure communication protocol includes at least one of an SSL protocol and an HTTPS protocol.

13. A system according to claim 7, wherein the mobile communication device of the requester is a telephone.

* * * * *